United States Patent
Osborne

(10) Patent No.: US 8,708,226 B2
(45) Date of Patent: Apr. 29, 2014

(54) SUPERVISOR PROGRAM

(75) Inventor: Steve Osborne, Oakville (CA)

(73) Assignee: NCR Corporation, Duluth, GA (US)

(*) Notice: Subject to any disclaimer, the term of this patent is extended or adjusted under 35 U.S.C. 154(b) by 2407 days.

(21) Appl. No.: 11/265,807

(22) Filed: Nov. 3, 2005

(65) Prior Publication Data

US 2006/0112012 A1 May 25, 2006

(30) Foreign Application Priority Data

Nov. 10, 2004 (GB) .................................. 0424743.3

(51) Int. Cl.
*G06Q 40/00* (2012.01)
(52) U.S. Cl.
USPC ........................................................ 235/379
(58) Field of Classification Search
USPC ........................................................ 235/379
See application file for complete search history.

(56) References Cited

U.S. PATENT DOCUMENTS

| 5,091,713 A | 2/1992 | Horne et al. |
| 5,253,167 A | 10/1993 | Yoshida et al. |
| 5,983,197 A | 11/1999 | Enta |
| 5,984,178 A | 11/1999 | Gill et al. |
| 6,279,826 B1 * | 8/2001 | Gill et al. ........................ 235/379 |
| 6,308,887 B1 * | 10/2001 | Korman et al. ................ 235/379 |
| 6,789,730 B1 | 9/2004 | Trelawney et al. |
| 2002/0032655 A1 | 3/2002 | Antonin et al. |
| 2004/0149818 A1 | 8/2004 | Shepley et al. |
| 2008/0185428 A1 * | 8/2008 | Shepley et al. ................ 235/379 |

FOREIGN PATENT DOCUMENTS

| EP | 1 081 664 A2 | 3/2001 |
| EP | 1 324 286 A2 | 7/2003 |
| GB | 2 207 789 A | 2/1989 |
| JP | 2002042218 A | 2/2002 |

* cited by examiner

*Primary Examiner* — Daniel Hess
(74) *Attorney, Agent, or Firm* — Paul W. Martin

(57) ABSTRACT

A supervisor program (130) for monitoring a self-service terminal (10) executing a terminal application suite (70,80) is described herein. The supervisor program (130) comprises: an internal interface (132) for communicating with the terminal application suite (70,80) to collect supervisor information and at least one supervisor utility (150). Each supervisor utility (150) is configured to collate specific information and each utility (150) has an external interface (154) for directly communicating the collated information to a service provider (114,116,118) external to the terminal (10). This enables the external service provider (114,116,118) to determine if the terminal (10) requires attention. A method of supervising a self-service terminal is also described.

16 Claims, 5 Drawing Sheets

SUPERVISOR PROGRAM

BACKGROUND

The present invention relates to a supervisor program. In particular, the present invention relates to a supervisor program for use with a self-service terminal (SST), such as a kiosk or an automated teller machine (ATM), and to an SST incorporating such a supervisor program.

Self-service terminals are generally public-access devices that are designed to allow a user to conduct a transaction or to access information in an unassisted manner and/or in an unattended environment. SSTs typically include some form of tamper resistance (in both hardware and software) so that they are inherently resilient to faults and unauthorized access. SSTs include: (i) ATMs; (ii) non-cash kiosks that allow users to access information (for example, to view reward points on a reward card the user has inserted into the SST), print documents (for example, aircraft boarding cards), and such like; and (iii) kiosks that accept payment for services (for example, Web surfing kiosks, photo printing kiosks, kiosks that allow users to buy goods, kiosks that dispense medication, and such like). The term SST has a relatively broad meaning and may include vending machines and photocopiers.

An ATM is one type of SST, and typically includes a cash dispenser for dispensing currency to a user subsequent to identifying the user and validating that the user has sufficient funds to cover the amount of currency to be dispensed.

An ATM operates under software control. Typical ATM software includes operating system software, a run-time platform, and a control application (CA); although these have been listed as three separate items, the run-time platform and the control application may be combined into a single terminal application suite.

The operating system is typically a conventional personal computer operating system, such as a Microsoft Windows NT (trade mark) operating system. As is well known in the art, the operating system is responsible for memory, process, task, and disk management and sends high level commands to device drivers that control devices in the ATM. The operating system may be integrated into the run-time platform.

The run-time platform is used for (i) interfacing with the operating system, (ii) providing device drivers for non-standard computing devices (for example, cash dispenser devices), and (iii) providing industry-standard interfaces (application programming interfaces (APIs)) to the control application and any other applications executing on the ATM. These industry-standard interfaces enable the control application to make use of self-service devices (PIN pads, cash dispensers, and such like), and to obtain device status and fault management information.

Typical industry-standard interfaces include a CEN XFS (extensions for Financial Services) interface (published by the European Committee for Standardization), an Active XFS interface, a device status management (DSM) interface, and such like. The CEN XFS interface enables ATM peripherals, such as cash dispensers, card readers, encrypting PIN pads, and printers, to interface with Windows-based applications. The Active XFS interface "sits on top of" (that is, it provides an interface to) the CEN XFS interface and provides a simpler mechanism for accessing the CEN XFS interface.

The control application (CA) includes a transaction processing component (TPC) and a management component (MC).

The TPC offers a user a suite of transactions and services by providing the processing logic and presentation functionality through which a cardholder can perform transactions. The TPC executes XFS-compliant commands, which are implemented by the run-time platform.

The management component (MC) records status, fault, and other information about the ATM, and captures and handles errors to ensure that the ATM does not unexpectedly go out of service. Furthermore, the MC provides supervisory functions to monitor the operation of the ATM, and includes an industry-standard communication facility to report status information and errors to a remote management station.

The MC includes a system application that allows a service engineer to access the status and fault information stored within the ATM. By accessing the status and fault information, the engineer can more easily diagnose problems and determine if any action needs to be taken (for example, replenishment operations or maintenance tasks).

It is common for the major ATM vendors and independent ATM software providers to sell a terminal application suite that integrates the run-time platform and the control application (CA), so that all of the functions are provided by a large monolithic application.

Providing a single software suite that does all these functions has the disadvantage that it is unlikely that any one suite has the "best-in-class" implementation of each function to be performed by that suite.

Another disadvantage is that the software transmits all status and fault information to a single communication facility, which then forwards the status and fault information as appropriate.

SUMMARY

It is among the objects of an embodiment of the present invention to obviate or mitigate the above disadvantages or other disadvantages associated with prior art self-service terminal applications and/or systems.

According to a first aspect of the present invention there is provided a supervisor program for monitoring a self-service terminal executing a terminal application suite, the supervisor program comprising: an internal interface for communicating with the terminal application suite to collect supervisor information; at least one supervisor utility, each utility being configured to collate specific information and each utility having an external interface for directly communicating the collated information to a service provider external to the terminal to enable the external service provider to determine if the terminal requires attention.

By matching the specific information collated by a supervisor utility with information required by a service provider, a dedicated supervisor utility can be provided for each service provider. By allowing the supervisor utility to contact the service provider directly, the service provider can immediately address any problems reported by the supervisor utility.

It should be appreciated that the term "service provider" when used herein refers to an organization that dispatches people or other resources (such as software) to repair, maintain, or replenish a self-service terminal.

It should be appreciated that the term "directly" as used herein to describe the communication between a supervisor utility and an external service provider does not mean that there cannot be any device between the supervisor utility and the external service provider. In practical embodiments, there may be many routers, handlers, and such like that convey network traffic. However, the term "directly" as used in this context means that there is a dedicated link between the utility and the service provider to allow the service provider to interrogate the utility and the utility to convey information to the service provider. This dedicated link may be provided by a network shared with other service providers.

Although each supervisor utility has its own interface, a common structure may be provided to allow each utility to communicate via a common mechanism; for example, an SNMP (simple network management protocol) agent structure or Web Services may be used to allow all of the supervisor utilities to communicate with their respective service providers via a common internet (IP network) connection.

It should be appreciated that the supervisor program is separate from the terminal application suite, and can be installed at a different time to installation of the terminal application suite.

As used herein, the term "internal interface" refers to an interface between two or more software entities executing on an SST.

As used herein, the term "external interface" refers to an interface between a software entity executing on an SST and one or more software entities executing on a device external to the SST.

The terminal application suite preferably comprises a run-time platform and a control application (CA).

The supervisor program may interface with the run-time platform either directly or via the CA. The run-time platform may incorporate an operating system or may be installed separately from an operating system.

The supervisor program may communicate with a routing agent for routing all information to a management station. This enables the management station to log all information sent from the supervisor utilities to the external service providers. This may be useful as evidence that information was sent to an external service provider in the event that the external service provider denies receiving that communication. This also provides the management station with a holistic view of the terminal. Thus, the supervisor program may have two types of communication channel: (i) a direct channel to a service provider, and (ii) a central channel to a management station. In typical installations, there may be multiple direct channels (each to a different service provider) but only one central channel. These channels may be implemented as distinct logical channels, for example, as different ports on an IP address.

Preferably, the internal interface is an XFS interface allowing communication using XFS-compliant commands. The particular type of internal interface used is not important, provided it is an open interface used by terminal application suite vendors so that the supervisor program may communicate with the terminal application suite using standard commands.

The routing agent may be implemented by an SNMP (Simple Network Management Protocol) agent. Alternatively, any convenient industry-standard or proprietary routing agent may be used. The SNMP agent preferably routes supervisor information from the supervisor program to a management centre that collates all state of health and diagnostic information relating to that terminal.

The supervisor utilities may be implemented in a single executable file; alternatively, the supervisor utilities may be implemented as separate components. Each utility is preferably a concurrently executing routine, for example a software agent or a software object, having an agent or object interface, respectively.

Preferably, the supervisor utilities include one or more of the following utilities: a first line maintenance utility; a replenishment utility; a second line maintenance utility; a vendor mode utility; a view of device status and state of health; and a fraud manager. It will be apparent to one of skill in the art that any type of maintenance, repair, or replenishment operation relating to a self-service terminal, and triggered by a status, time, or fault condition in the terminal, could be implemented using a supervisor utility.

The first line maintenance utility preferably receives terminal information such as: counters and tallies data, status data, and replenishment data. This enables the first line maintenance personnel to receive information about any media jams or misfeeds occurring within the terminal.

In embodiments using a replenishment utility, the replenishment utility may be interconnected to a replenishment service provider via a dedicated interface. The replenishment service provider may receive information about counters and tallies, logs, settlement data, and replenishment data.

The dedicated interface may implement a client server communication architecture. The dedicated interface may utilize "push" technologies.

The dedicated interface is preferably an open interface implemented by SNMP agents or Web Services.

SNMP is a standard protocol for managing nodes on an IP network.

Web Services are self-contained, self-describing, modular applications that can be published, accessed, and invoked across the Web. A Web Service performs a function. Once a Web Service is deployed, other applications (and other Web Services) can discover and invoke the deployed service.

A Web Service is described using a description language called WSDL (Web Services Description Language) so that once a program accesses a WSDL description of a Web Service, the program has everything it needs to make use of that Web Service.

Conveniently, SOAP (simple object access protocol) is used to package requests for Web Services and responses from Web Services.

If Web Services do not provide sufficient security, then an SNMP agent structure may be preferred.

The dedicated interface may use a predefined port on an IP network, and may use HTTP (hyper text transfer protocol) to communicate SOAP packets.

Using Web Services or an SNMP structure enables the replenishment service provider to contact the replenishment utility directly to determine the amount of media remaining in the terminal and/or the amount of media presented to users. The media may be currency, valuable documents (such as blank tickets), receipt paper, or such like.

One advantage of using Web Services is that a single open interface can be developed for use with each supervisor utility, but each service provider can develop its own Web-based programs for accessing these Web Services. This enables each service provider to create its own programs for accessing the supervisor utility, thereby easing problems associated with integrating such programs into the service provider's enterprise architecture.

In some embodiments, a plurality of replenishment utilities may be used, one for currency, one for tickets, and such like. Each replenishment utility may communicate with a different replenishment service provider.

The second line maintenance utility may be interconnected to a technician service provider via a dedicated interface (such as a Web Services interface). This enables the technician service provider to dispatch a technician to the terminal in the event of a failure of one of the devices within the terminal, without having to await a request from the management centre.

The second line utility may provide information about counters and tallies, status data, diagnostic/self-test data, logs (including hardware inventories, software inventories, and device information), and replenishment data. Hardware inventories include identification of terminal part numbers. Software inventories include identification of installed components and revision levels. Device information includes firmware levels and part numbers.

The management centre may gather supervisor information from the terminal application suite (including the control application, the run-time platform, and devices mounted within the terminal). Thus, the management centre may collate all supervisor information from the terminal, but does not have to request service providers to assist the terminal, as each supervisor utility communicates directly with one or more of the service providers.

The terminal may be an ATM, a kiosk, a vending machine, or such like.

By virtue of this aspect of the present invention, a supervisor program is provided that informs a management centre of status information including any problems within a terminal, and also informs an appropriate remote service provider directly, thereby reducing the time taken to obtain assistance.

Furthermore, this aspect of the invention allows a supervisor program to be used with any run-time platform and control application, provided the platform and application comply with the internal open interface. This enables an organization to use a single type of supervisor program in multiple terminals, where some of the terminals execute a run-time platform and CA provided by one vendor, and other terminals execute a platform and CA provided by a different vendor. This ensures that a "best-in-class" supervisor program can be selected.

Having supervisor utilities that can communicate directly with service providers facilitates efficient outsourcing of terminal monitoring, maintenance, and replenishment operations.

According to a second aspect of the present invention there is provided a method of supervising a self-service terminal executing a terminal application suite, the method comprising: communicating with the self-service terminal application suite via an internal interface to collect supervisor information in at least one supervisor utility, and communicating the collected supervisor information directly to a service provider external to the terminal so that the external service provider can remotely monitory the status of the terminal.

The method may include the further step of communicating the collected supervisor information to a remote management centre via a routing agent. Thus, information from multiple supervisor utilities may be communicated to the remote management centre, while each supervisor utility transmits its own information to a dedicated service provider.

According to a third aspect of the present invention there is provided a self-service terminal supervisory system comprising a self-service terminal and a plurality of service providers at locations external to the terminal; the terminal comprising a supervisor program including a first interface to a terminal application suite and a plurality of supervisor utilities, the supervisor utilities having a second interface directly accessible to each of the external service providers to enable each external service provider to obtain direct access to supervisor information collated by the supervisor program.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
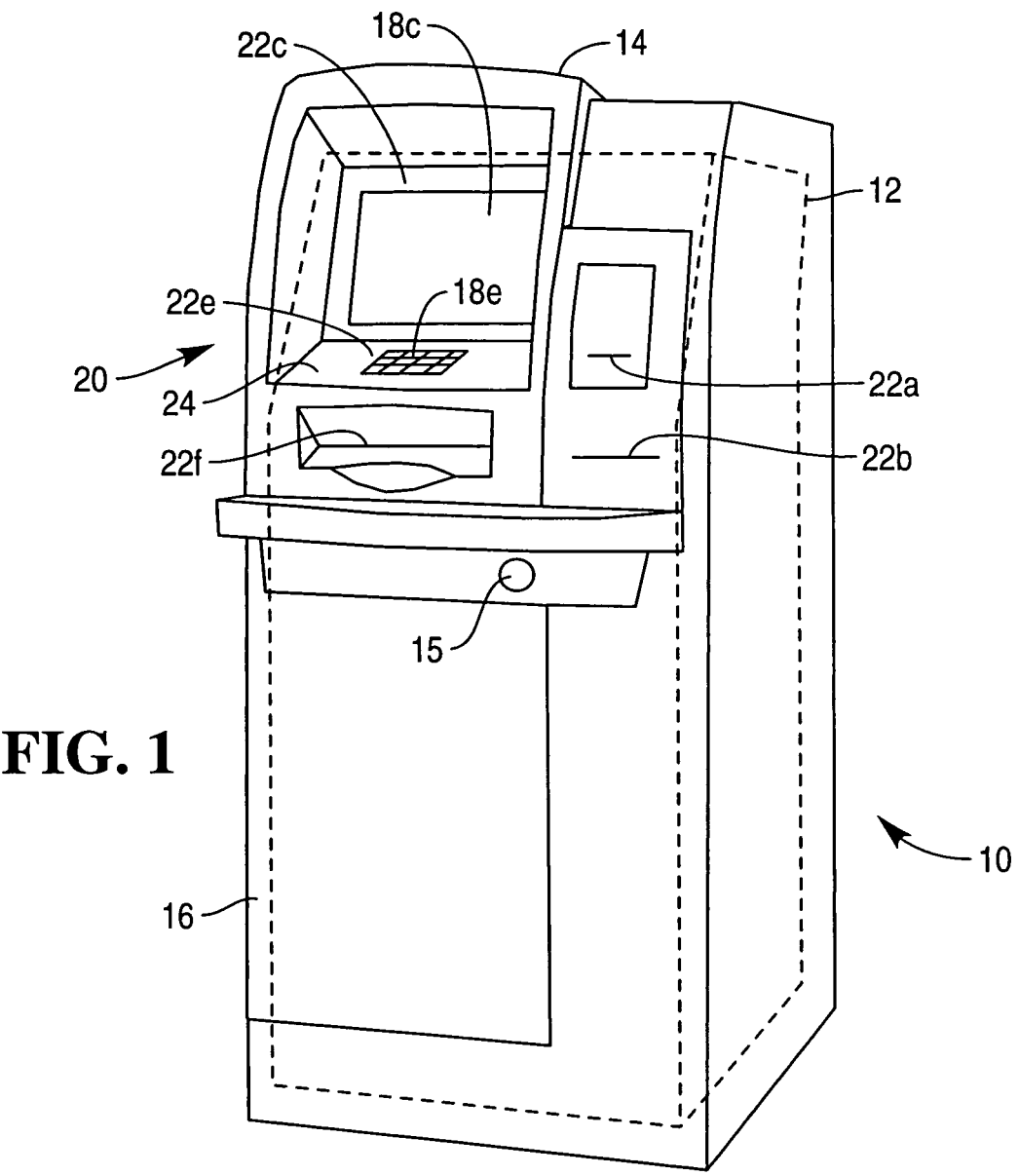
FIG. 1 is a perspective view of a self-service terminal including a supervisor program according to one embodiment of the present invention.
Figure 2:
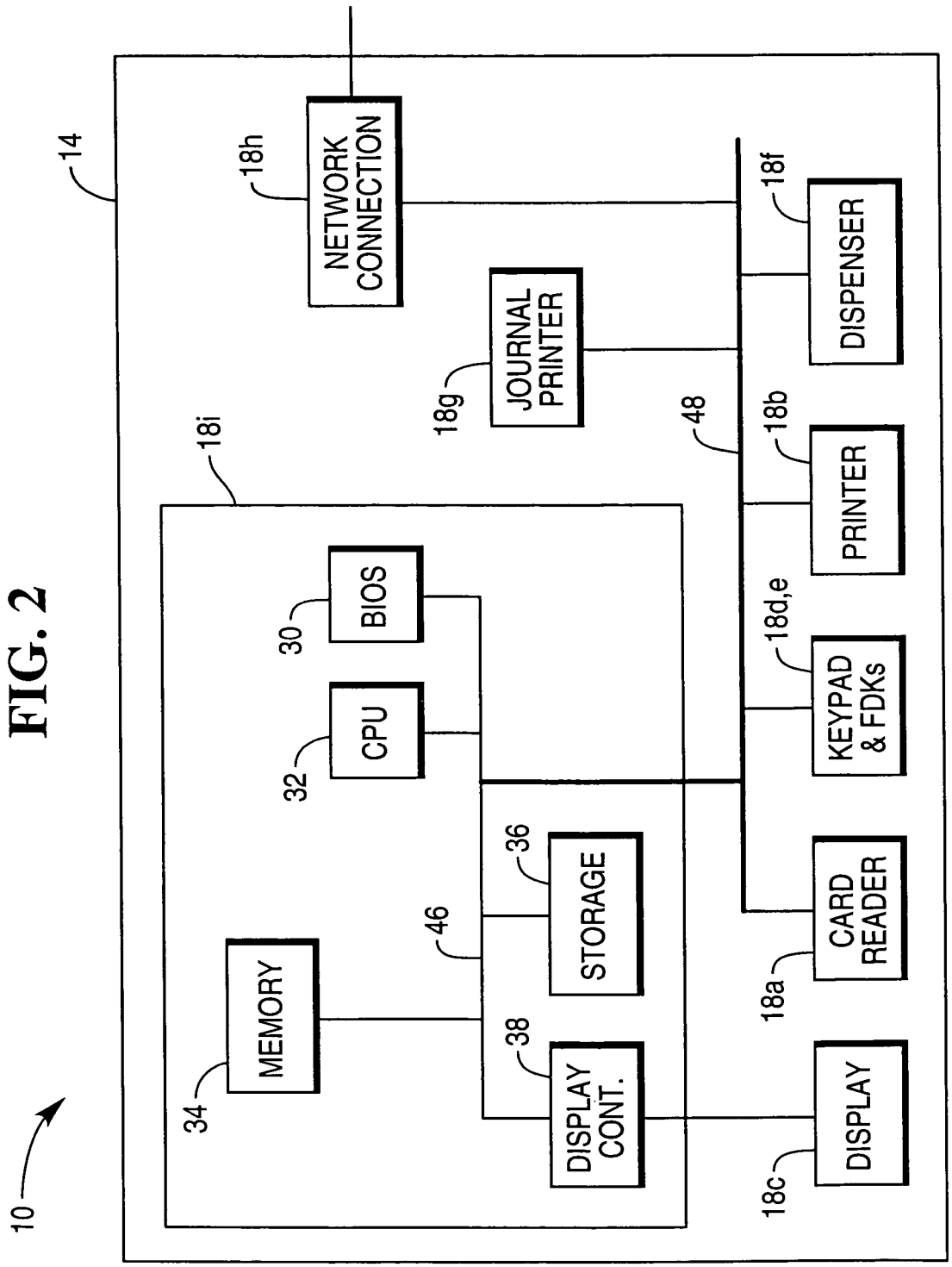
FIG. 2 is a simplified block diagram illustrating the terminal of FIG. 1.

Reference is first made to FIG. 1, which is a perspective view of a self-service terminal, in the form of an ATM 10, executing a supervisor program according to one embodiment of the invention. Reference is also made to FIG. 2, which is a schematic diagram illustrating the ATM 10 of FIG. 1 and showing internal devices mounted within the ATM 10.

The ATM 10 has a chassis 12 (shown in dotted line) to which is pivotably coupled a plastic fascia 14 covering an upper portion of the chassis 12, and secured thereto by a lock mechanism 15. A door 16 is hingably coupled to a lower portion of the chassis 12. When the fascia 14 is unlocked and hinged open and the door 16 is swung open, an operator can gain access to devices 18 located within the ATM 10.

The fascia 14 provides a user interface 20 to allow a user to interact with the ATM 10. In particular, the fascia 14 has apertures 22 aligning with devices 18 when the fascia 14 is pivoted to the closed position.

The fascia 14 defines: a card reader slot 22a aligning with a card reader device 18a; a receipt printer slot 22b aligning with a receipt printer device 18b; a display aperture 22c aligning with a display 18c and associated function display keys (FDKs) 18d disposed as two columns, each on opposing sides of the display 18c; a keypad aperture 22e through which an encrypting keypad device 18e protrudes; and a dispenser slot 22f aligning with a dispenser device 18f.

With the exception of the encrypting keypad 18e, the devices 18 are all mounted within the chassis 12. The encrypting keypad 18e is mounted on a shelf portion 24 of the fascia 14, which extends outwardly from beneath the display aperture 22c.

Referring now to FIG. 2, the ATM 10 also includes the following internal devices 18 that are not directly viewed or accessed by a user during the course of a transaction. These devices 18 include: a journal printer device 18g for creating a record of every transaction executed by the ATM 10, a network connection device 18h for accessing a remote authorization system (not shown), and a controller device 18i (in the form of a PC core) for controlling the operation of the ATM 10, including the operation of the other devices 18. These devices 18g,h,i are all mounted within the chassis 12 of the ATM 10.

The controller 18i comprises a BIOS 30 stored in non-volatile memory, a microprocessor 32, associated main memory 34, storage space 36 in the form of a magnetic disk drive, and a display controller 38 in the form of a graphics card.

The BIOS 30, microprocessor 32, main memory 34, disk drive 36, and graphics card 38 are all replaceable modules within the controller device 18i.

The display 18c is connected to the microprocessor 32 via the graphics card 38 installed in the controller 18i and one or more internal controller buses 46. The other ATM devices (18*a*, *b*, and 18*d* to 18*h*) are connected to the ATM controller 18*i* via a device bus 48 and the one or more internal controller buses 46.

Initialization of the ATM

When the ATM 10 is booted up, the microprocessor 32 accesses the magnetic disk drive 36 and loads the main memory 34 with software components, as will be described with reference to FIG. 3, which is a schematic diagram illustrating how software components interact in main memory 34.

The microprocessor 32 loads an operating system kernel 60 into the main memory 34. In this embodiment, the operating system is a Windows NT (trade mark) operating system, available from Microsoft Corporation. The operating system includes a plurality of device drivers 62*a,b,* . . . for interfacing with standard computing devices such as the magnetic disk drive 36, the display 18*c*, a serial port, a parallel port, and such like. As is well known in the art, the operating system kernel 60 is responsible for memory, process, task, and disk management, and includes routines for implementing these functions.

The microprocessor 32 also loads a run-time platform 70 into the main memory 34. In this embodiment, the runtime platform 70 is a set of APTRA (trade mark) XFS components, available from NCR Corporation, 1700 S. Patterson Blvd., Dayton, Ohio 45479, U.S.A. The run-time platform 70 provides a range of programming facilities specific to self-service terminal devices and services.

One function of the run-time platform 70 is to enhance the operating system 60 so that the operating system and run-time platform 70 together provide high level access to all of the devices 18, including both standard computing devices (via the operating system 60), and non-standard computing devices (via the run-time platform 70). Thus, the combination of the run-time platform 70 and the operating system 60 can be viewed as providing a complete ATM operating system.

The platform 70 comprises a plurality of self-service device drivers 72*a,b,* . . . that interface with self-service specific devices. Although only three device drivers 72 are shown, there are many device drivers in the platform 70, one for each self-service specific device, such as the card reader 18*a*, the receipt printer 18*b*, the FDKs 18*d*, the encrypting keypad 18*e*, and the cash dispenser 18*f*. Furthermore, there are many more devices 18 in an ATM than those described herein, for example there are more standard computing devices such as serial ports and a parallel port, there are also more self-service devices such as a rear operator panel. These devices are not discussed herein because they are not essential to an understanding of the invention.

The platform 70 also includes support files (not shown) for use with the self-service drivers 72 to allow each device 18 to operate. For each self-service device 18, the driver 72 and any associated support files enable that device 18 to be operated, tested, maintained, and configured. The platform 70 also includes drivers to facilitate encrypted communication between the devices 18, for example, between the card reader 18*a* and the controller 18*i*, between the printer 18*b* and the controller 18*i*, and such like.

If a new device is to be added to the ATM 10, then a corresponding driver and any associated support files are also added. Thus, the platform 70 provides the environment needed for the ATM's self-service devices to be operated and maintained.

The microprocessor 32 also loads a control application (CA) 80 into the main memory 34. The CA 80 provides transaction processing functions (for customers and for maintenance personnel) and device management functions.

Figure 3:
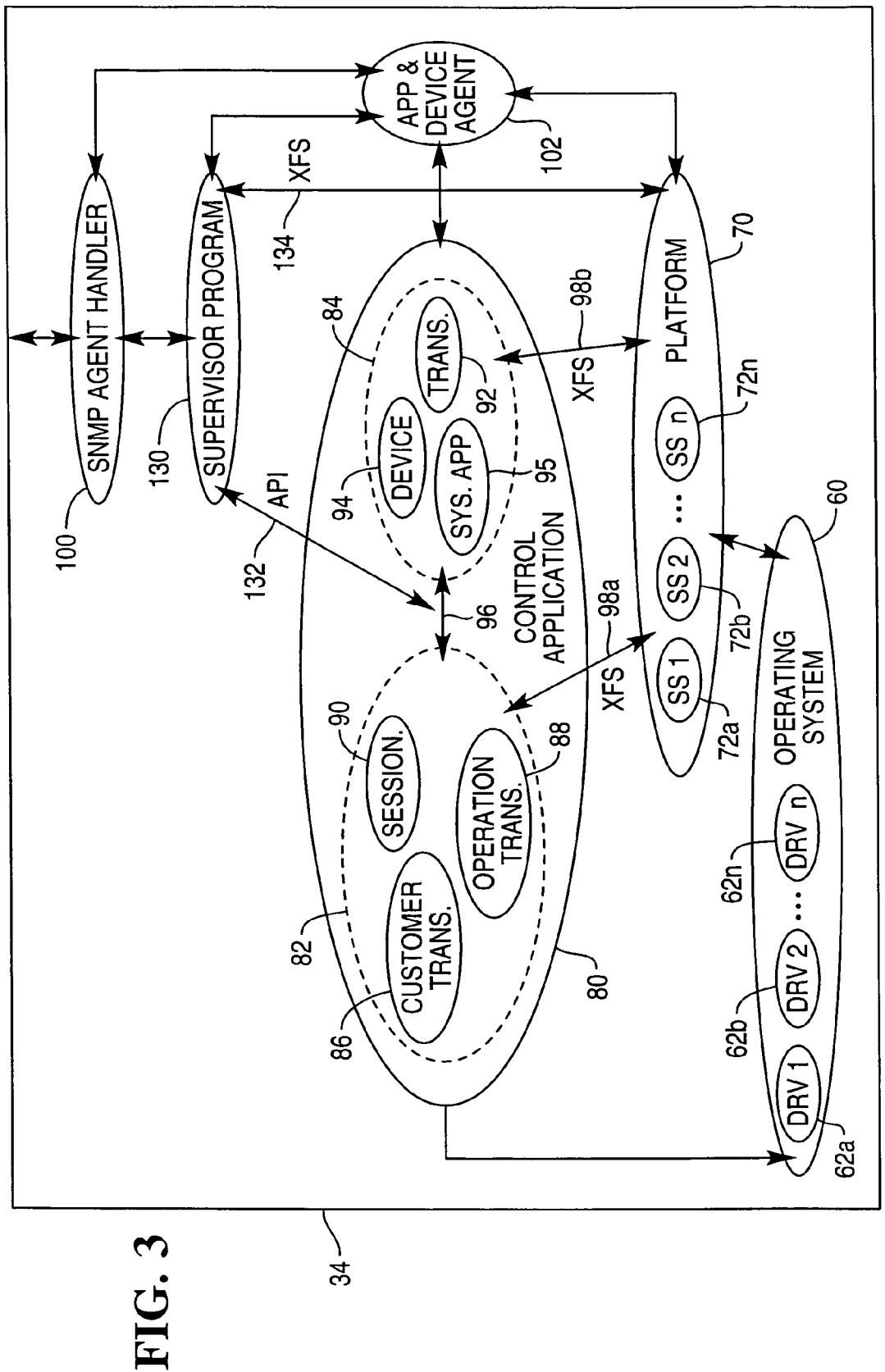
FIG. 3 is a schematic diagram illustrating software components executing in a memory of the terminal of FIG. 1.

For clarity, and to aid understanding, the control application 80 is represented in FIG. 3 as comprising two logical parts: a transaction processing part 82 for implementing transaction processing functions, and a management part 84 for implementing device management functions. Each of these parts comprises a plurality of objects, each object performing a predetermined function. However, it should be appreciated that the particular structure used to implement these functions is a matter of design choice, for example, the control application 80 may be implemented as a single monolithic program, or as a set of discrete objects that can interact with one another.

The transaction processing part 82 includes a customer transaction processing object 86, an operation transaction processing object 88, and a session manager object 90.

The management part 84 includes a transaction management object 92, a device management object 94, and a system application object 95.

In this embodiment, objects in the transaction processing part 82 interact with objects in the management part 84 either directly via an object interface 96, or indirectly via an open interface 98 to the platform 70.

The open interface 98 is a standard interface for making use of self-service devices 18 (referred to herein as a CEN XFS API). This CEN XFS interface is used to instruct the devices 18 to perform operations, and is also used to obtain device status and fault management information.

The customer transaction object 86 provides processing logic and presentation information to allow a customer to execute a transaction at the ATM 10. The customer transaction object 86 controls the presentation of screens to an ATM customer to guide a customer through a transaction.

The term "screen" is used herein to denote the graphics, text, controls (such as menu options), and such like, that are presented on an SST display; the term "screen" as used herein does not refer to the hardware (that is, the display) that presents the graphics, text, controls, and such like. Typically, when a transaction is being entered at an SST, a series of screens are presented in succession on the SST display, the next screen displayed being dependent on a customer entry or activity relating to the current screen. For example, a first screen may request a customer to insert a card; once a card has been inserted a second screen may invite the customer to enter his/her PIN; once the final digit of the PIN has been entered, a third screen may invite the customer to select a transaction; and so on.

The operation transaction object 88 provides processing logic and presentation information (typically presented on a rear operator panel, which is not shown in the drawings) to allow maintenance personnel (such as technicians or replenishers) from a service provider to execute replenishment or diagnostic operations at the ATM 10. The operation transaction object 88 controls the presentation of information to an ATM service engineer to guide the engineer through a replenishment or diagnostic operation.

The session object 90 provides persistence throughout a consecutive sequence of interactions. For an ATM transaction, a session may cover the duration of a transaction from a customer entering a card into the ATM card reader slot 22*a* to the customer concluding a transaction at that ATM 10; for example, by retrieving the card or dispensed cash. A session may also cover the duration of a replenishment or diagnostic operation performed by a maintenance person, the duration of a request from the ATM 10 to a third party information provider (such as a CRM database or advertisement provider), or such like.

In the management part 84, the transaction management object 92 records information relating to the status and operation of the customer transaction object 86 and the operation transaction object 88. For example, the transaction management object 92 records when the customer transaction object 86 is active, and the current state (and/or screen) of the customer transaction object 86. Similarly, the transaction management object 92 records when the operation transaction object 88 is active (that is, when a maintenance person (or other authorized person) is replenishing, maintaining, or diagnosing the ATM 10), and the current state (and/or screen) the operation transaction object 88 is in. The transaction management object 92 also records any regular data sent by the transaction objects 86,88 to indicate that these objects 86,88 are operating normally (sometimes referred to as a heartbeat). The transaction management object 92 also records significant events of the customer or operation transaction objects 86,88. These significant events include when the customer transaction object 86 is out of service.

In the management part 84, the device management object 94 collates status and fault information from the devices 18 via the run-time platform 70 and operating system 60, and makes this information available to the system application object 95.

The system application object 95 provides an operator (not an ATM customer, but a maintenance person such as a service engineer or other authorized person) with access to functions required to configure, diagnose, and maintain the ATM 10. The following seven system application functions (in addition to some others) are available from the system application 95 via the operation transaction processing object 88:

(i) maintenance,
(ii) device self-tests,
(iii) event logs,
(iv) service tallies,
(v) device status lists,
(vi) device servicing, and
(vii) device configuration.

These seven functions are implemented by accessing the device management object 94, and are explained in more detail below.

Some self-service devices are able to clear themselves when instructed to do so, for example, a card reader and a receipt printer. These operations are referred to herein as "maintenance" operations and can be performed by a maintenance person implementing the maintenance function from the system application 95.

Typically, each self-service device is able to perform one or more tests on itself to determine if it is operating correctly. This is referred to herein as a "device self-test", and can be initiated via the system application 95.

Windows NT (trade mark) records entries relating to: software operations (for example a time-out or a failure in accessing an object); device operations; and communication operations (for example, failure to receive an expected response to a message). These entries are referred to herein as "event logs" and the system application 95 allows the operator or engineer to view these event logs, search and filter these event logs, and copy these event logs to a diskette or print them out.

A "service tally" provides a list of the times at which a "service" has been requested for a particular device 18 since the tally was last reset. Typically, only service engineers can reset a tally. In this context, a "service" relates to software used to access functionality provided by a self-service device 18; for example, "dispense cash" is a service associated with the cash dispenser device 18f. This allows the customer transaction processing object 86 to be able to issue a "dispense cash" request to the platform 70, together with the amount to be dispensed, and the platform 70 provides the low level commands required to instruct the cash dispenser to dispense the amount of cash requested.

Care should be taken to distinguish between two different uses of the word "service" herein. The first use relates to software or an interface providing functionality to the control application 80 or some other application. The second use relates to repair, replacement, replenishment, cleaning or such like operations performed by a service engineer. It should be clear from the context which particular meaning is intended.

The "device status list" displays a list of all the devices 18 having states that require attention. For example, a cash dispenser device 18f may have a currency cassette that requires replenishment. The following information is provided for each device state requiring attention: device name—this is the name of the device that requires attention; description—this is a short description of the problem; attention—this shows whether the state requires attention 'now' or will require attention 'soon'; user category—this specifies what type of user is able to deal with the state (for example, a service engineer, or an operator who clears media jams). Typically, a service engineer will be authorized to perform more operations than an operator. An operator may only be allowed to clear jams in a printer, replenish a printer with printable media, and such like.

The "device status list" includes replenishment states (where a consumable item, such as currency or a paper roll for a printer, needs replaced), and fault states (where a fault exists, such as a paper jam in a printer that needs to be cleared).

The "device servicing" function enables a service engineer to service (in the sense of repair, replace, replenish, clean, or such like) a device 18 even if that device does not report that it requires servicing. Once the service engineer has performed the service, the "device servicing" function automatically tests the serviced device to ensure that it is operating correctly. One example of a device servicing action may be emptying a purge bin.

The self-service "device configuration" function allows an operator or engineer to display and set hardware and software parameters, such as the language used, alarms, and such like. A service engineer can also use the "self-service configuration" function to set a printer active to allow the "device status list", "event logs", "service tallies" or such like to be printed by the ATM 10.

These seven system application functions operate by sending requests and receiving responses via the object interface 96 between the operation transaction processing object 82 and the system application 95.

The management part 84 includes fault handling capabilities to cope with any faults or exceptions, thereby ensuring that the ATM 10 does not suddenly go out of service, for example, during a transaction. In particular, the fault handler capability of the management part 84 deals with critical errors such as processor exceptions and memory protection violations, operating system exceptions, device exceptions, kernel level exceptions, catastrophic software problems, persistent failures, and power failures.

An ATM SNMP agent handler 100 is instantiated in main memory to manage certain communications with software entities external to the ATM 10, as will be described in more detail below.

The ATM SNMP agent handler 100 also communicates with a plurality of sub-agents, one of which is an application and device sub-agent 102, to direct agent requests to an appropriate sub-agent and to forward agent responses to an external software entity.

The application and device sub-agent 102 receives fault and status information from the platform 70 and the control application 80, and conveys this received information to a remote management centre 110 (illustrated in, and described with reference to, FIG. 4 below).

Figure 4:
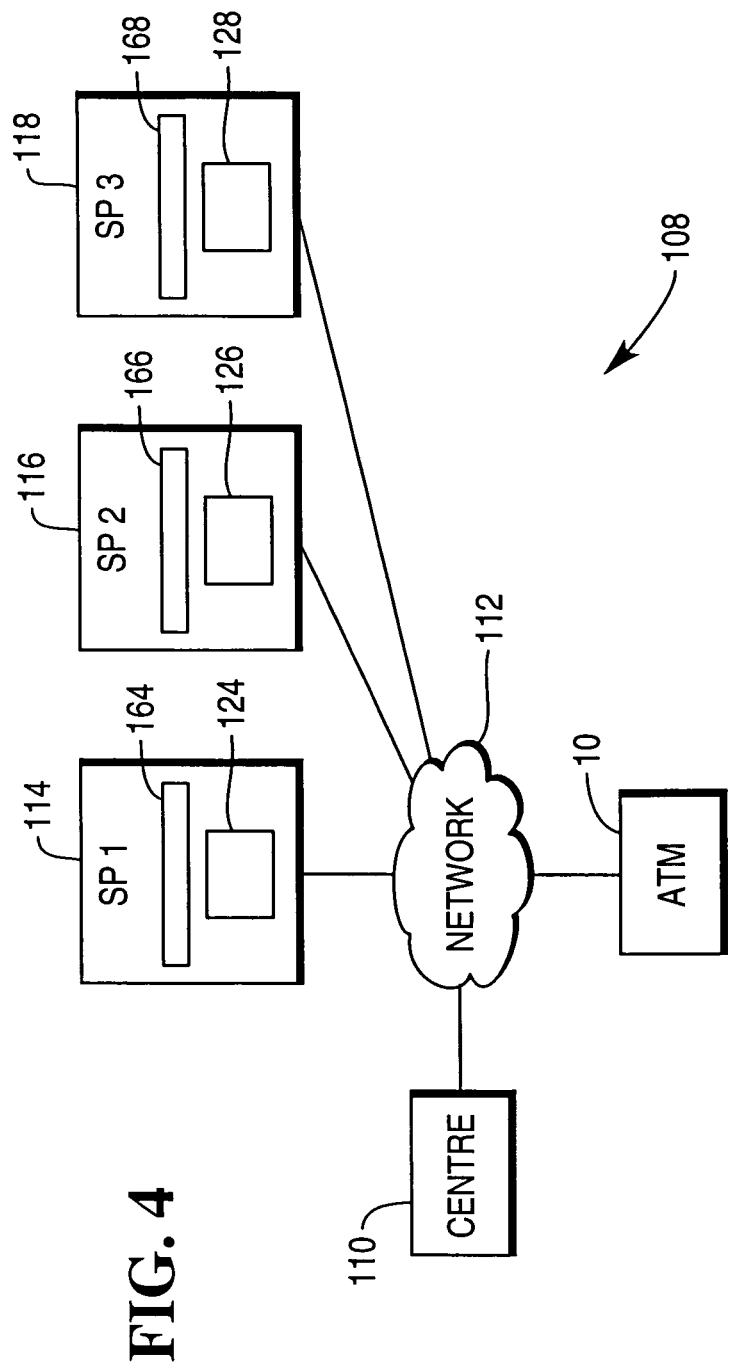
FIG. 4 is a block diagram illustrating a system including the self-service terminal of FIG. 1.

At this point, reference will also be made to FIG. 4, which is a block diagram illustrating a system 108 including the ATM 10.

In FIG. 4, the ATM 10 is coupled to an IP network 112, in the form of a private intranet. The remote management centre 110 introduced with reference to FIG. 3 is also connected to the ATM 10 via the IP network 112. A first line maintenance organization 114, a second line maintenance organization 116, and a currency replenishment organization 118 are also connected to the ATM 10 via the IP network 112. Each of these organizations 114 to 118 is coupled to the IP network 112 by an external SNMP agent manager 124 to 128 located within each respective organization. These organizations are service providers for the ATM 10.

Referring again to FIG. 3, the final part of the initialization procedure is for the microprocessor 32 to load a supervisor program 130 into the main memory 34.

The supervisor program 130 interfaces with the CA 80 via an open interface 132, labeled API in FIG. 3. In this embodiment the open interface 132 is an ActiveX interface. The supervisor program 130 also interfaces with the platform 70 via an XFS interface 134, labeled XFS in FIG. 3.

Figure 5:
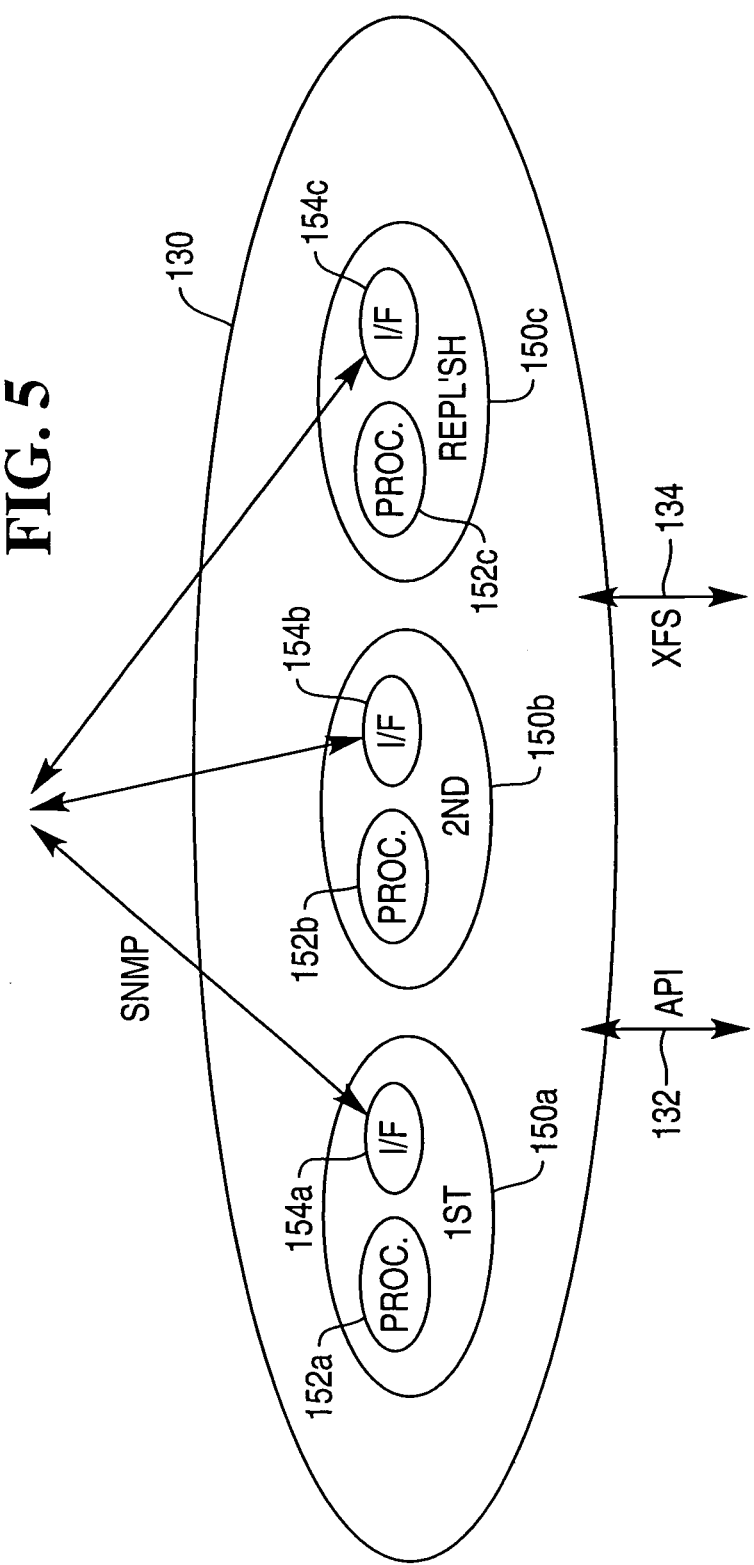
FIG. 5 is a schematic diagram illustrating the supervisor program in more detail.

The supervisor program 130 is shown in more detail in FIG. 5, which is a schematic diagram illustrating components within the supervisor program 130.

The supervisor program 130 comprises three supervisor utilities 150a,b,c. Each supervisor utility 150a,b,c is a sub-agent that communicates with the ATM SNMP agent handler 100.

Each supervisor utility 150 comprises a processing component 152 and an interface component 154.

Supervisor utility 150a provides dedicated information to the first line maintenance organization 114. Supervisor utility 150b provides dedicated information to the second line maintenance organization 116. Similarly, supervisor utility 150c provides dedicated information to the currency replenishment organization 118.

Each of these three utilities 150a,b,c can access the management part 84 (particularly the device management object 94) to retrieve relevant information. For each utility 150, relevant information is information that can be used to determine if the dedicated organization needs to take any action to maintain the ATM 10 in working order.

As an example, sub-agent 150a monitors certain devices 18, and modules within those devices 18, to determine if a first line maintenance person needs to take any action. A first line maintenance person can generally perform operations that do not require any tools, such as clearing misfeeds, replacing rolls of paper in printers, and such like. Typically, the sub-agent 150a obtains status information from the receipt printer 18b and the journal printer 18g. This status information includes details of the amount of media (paper) remaining within each printer, details of how many print operations have been performed, and such like.

Sub-agent 150b provides dedicated information to the second line maintenance organization 116 and monitors every device 18 within the ATM 10, and all modules within those devices 18, because the second line maintenance person needs to be able to fix any problem that arises within the ATM 10.

Sub-agent 150c provides dedicated information to the currency replenishment organization 118, and monitors the currency dispenser 18f to determine if the ATM 10 needs more currency.

Referring again to FIG. 4, each external SNMP agent manager 124,126,128 interfaces with an enterprise application 164,166,168. The enterprise application (such as 164) conveys information received by the respective external SNMP agent manager 124 to individuals or automated processes within the organization 114. Similarly, the enterprise application 164 allows individuals or software entities within the organization to send requests to the ATM 10 via the external SNMP agent manager 124. The external SNMP agent manager 124 conveys this request to the ATM SNMP agent handler 100, which routes this request to the sub-agent 150a dedicated to the organization 114. The sub-agent 150a receives this request via the interface component 154a and conveys it to the processing component 152a.

The processing component 152 in each sub-agent 150 is able to generate a "trap" to indicate a status change or a fault, and the interface component 154 conveys this trap to the dedicated organization. This feature of generating a trap is provided in accordance with the SNMP standard.

The processing component 152 within each sub-agent 150 is able to access status and fault information stored in the device management object 94 for those devices 18 that require management by the organization to which that sub-agent 150 is dedicated. Thus, each sub-agent has a view of the status and fault information from a set of devices 18.

The ATM SNMP agent handler 100 conveys all status and fault information from the ATM (which may be transmitted from the application and device sub-agent 102, the first line maintenance sub-agent 150, the second line maintenance sub-agent 150b, or the replenishment sub-agent 150c) to the remote management centre 110. This ensures that the remote management centre 110 receives all the status and fault information sent to the organizations 114 to 118.

When the ATM is in use, if a paper misfeed occurs within the receipt printer 18b then the device management object 94 records this status change and notifies the appropriate sub-agents. One mode of operation may only notify the first line maintenance sub-agent 150a. Another mode of operation may notify both the first and second line maintenance sub-agents 150a,b. A third mode of operation may notify the first line maintenance sub-agent 150a first, and then the second line maintenance sub-agent 150b only if a first line maintenance person has not cleared the misfeed within a predetermined time period.

If there is a print head failure while the ATM 10 is in use, the second line maintenance organization 116 will receive a trap from its dedicated sub-agent 150b. A person or a software entity within the organization 116 will be notified of this event via the enterprise application 166, and will dispatch a maintenance person to repair the ATM 10.

If the amount of currency stored within the dispenser 18f falls below a predetermined level while the ATM 10 is in use, the currency replenishment organization 118 will receive a trap from its dedicated sub-agent 150c. A person or software entity within this organization 118 will be notified of this event via the enterprise application 168, and will dispatch a cash-in-transit vehicle to replenish the ATM 10 with currency.

It will now be appreciated that this embodiment of the present invention allows different organizations to manage an ATM 10, and to receive status and fault information directly from the ATM 10 being managed.

Various modifications may be made to the above described embodiment within the scope of the present invention; for example, in other embodiments, the supervisor utility 130 may comprise more or fewer than three supervisor utilities.

In other embodiments Windows (trade mark) Management Instrumentation (WMI) may be used to manage data collation. WMI is a component of the Microsoft (trade mark) Windows (trade mark) operating system and is the Microsoft (trade mark) implementation of Web-Based Enterprise Management (WBEM), which is an industry initiative to develop a standard technology for accessing management information in an enterprise environment. WMI uses the Common Information Model (CIM) industry standard to represent systems, applications, networks, devices, and other managed components.

In other embodiments, different supervisor utility structures may be used; for example, Web Services may be used instead of, or in addition to, an SNMP agent structure.

In other embodiments, an SST other than an ATM, for example, a non-cash kiosk, may be used.

What is claimed is:

1. A supervisor program for monitoring a self-service terminal executing a terminal application suite, the supervisor program comprising:
   an internal interface to collect supervisor information within the terminal; and
   a plurality of internal supervisor utilities, each utility being configured to collate specific information different than any other information collated by any other utility and each utility having an external interface for directly communicating collated specific information via a respective dedicated communications link to a computer of a respective one of a plurality of different dedicated service provider organizations external to the terminal to enable the computer of the one external service provider organization to determine if the terminal requires attention based upon the collated specific information and to dispatch resources to service the terminal when the attention is required.

2. A supervisor program according to claim 1, wherein the internal interface comprises an XFS interface allowing communication using XFS-compliant commands.

3. A supervisor program according to claim 1, wherein the supervisor utilities are implemented as separate components.

4. A supervisor program according to claim 1, wherein the supervisor utilities include one or more of the following utilities:
   a first line maintenance utility; a replenishment utility; and a second line maintenance utility.

5. A supervisor program according to claim 4, wherein a plurality of replenishment utilities are used.

6. A method of supervising a self-service terminal executing a terminal application suite, the method comprising:
   communicating with the self-service terminal application suite via an internal interface to collect supervisor information within the self-service terminal;
   communicating at least some collected supervisor information of a first type of a plurality of different types of supervisor information directly via a dedicated first communications link to a first computer of a dedicated first of a plurality of service provider organizations external to the terminal for processing the first type of supervisor information so that first computer of the external first service provider organization can remotely monitor first status of the terminal and dispatch resources to service the terminal when the first status of the terminal indicates that such service is required; and
   communicating at least some collected supervisor information of a second type directly via a dedicated second communications link to a second computer of a dedicated second service provider organization external to the terminal for processing the second type of supervisor information so that the external second service provider organization can remotely monitor second status of the terminal and dispatch resources to service the terminal when the second status of the terminal indicates that such service is required.

7. A method according to claim 6, further comprising:
   communicating the collected supervisor information to a remote management centre via a routing agent.

8. A self-service terminal supervisory system comprising:
   a management station;
   a plurality of computers at a plurality of different dedicated service provider organizations at different locations remote from the management station; and
   a self-service terminal at a location remote from the plurality of different dedicated service provider organizations, the terminal comprising a supervisor program including a first interface to a terminal application suite and a plurality of supervisor utilities for collating different types of supervisor information, the supervisor utilities having different second interfaces associated with the different types of supervisor information and directly accessible to the computers of the different dedicated service provider organizations to enable each computer of the external dedicated service provider organizations to obtain direct access to collated supervisor information;
   wherein each supervisor utility directly communicates the collated associated types of supervisor information via a respective dedicated communications link to the computer of a respective one of the dedicated service provider organizations to enable the external dedicated service provider organization to monitor status of the terminal and dispatch resources to service the terminal when the status of the terminal indicates that such service is required.

9. A self-service terminal supervisory system according to claim 8, wherein the second interface includes an agent handler.

10. A self-service terminal supervisory system according to claim 9, wherein the supervisor program communicates with the agent handler for routing all information to the management station.

11. A self-service terminal supervisory system according to claim 8, wherein the second interface comprises an SNMP agent handler.

12. A self-service terminal supervisory system according to claim 8, wherein the terminal comprises an automated teller machine (ATM).

13. A self-service terminal supervisory system according to claim 8, wherein the first interface comprises an XFS interface allowing communication using XFS-compliant commands.

14. A self-service terminal supervisory system according to claim 8, wherein (i) a first one of the supervisor utilities comprises a first line maintenance utility and (ii) a second one of the supervisor utilities comprises a second line maintenance utility which is different from the first line maintenance utility.

15. A self-service terminal supervisory system according to claim 8, wherein (i) a first one of the supervisor utilities comprises a first replenishment utility and (ii) a second one of the supervisor utilities comprises a second replenishment utility which is different from the first replenishment utility.

16. A self-service terminal supervisory system according to claim 8, wherein (i) a first one of the supervisor utilities comprises a first line maintenance utility, (ii) a second one of the supervisor utilities comprises a second line maintenance utility which is different from the first line maintenance utility, (iii) a third one of the supervisor utilities comprises a first replenishment utility and (iv) a fourth one of the supervisor utilities comprises a second replenishment utility which is different from the first replenishment utility.

* * * * *